United States Patent
Dehlsen et al.

(10) Patent No.: US 8,575,470 B2
(45) Date of Patent: Nov. 5, 2013

(54) INTEGRATED PANEL WITH SKYLIGHT, VENTILATION, SOLAR HOT WATER SYSTEM AND SOLAR PHOTOVOLTAIC/LIGHTING SYSTEM

(75) Inventors: James G. P. Dehlsen, Montecito, CA (US); James B. Dehlsen, Santa Barbara, CA (US); Alex Fleming, Santa Barbara, CA (US)

(73) Assignee: Ecomerit Technologies LLC, Santa Barbara, CA (US)

( * ) Notice: Subject to any disclaimer, the term of this patent is extended or adjusted under 35 U.S.C. 154(b) by 609 days.

(21) Appl. No.: 12/644,258

(22) Filed: Dec. 22, 2009

(65) Prior Publication Data

US 2011/0146662 A1    Jun. 23, 2011

(51) Int. Cl.
*H01L 31/042*   (2006.01)
*F24J 2/38*     (2006.01)

(52) U.S. Cl.
USPC ............ 136/246; 126/600; 126/621; 126/680

(58) Field of Classification Search
USPC ............................ 136/246; 126/600, 621, 680
See application file for complete search history.

(56) References Cited

U.S. PATENT DOCUMENTS

| | | | |
|---|---|---|---|
| 4,058,111 A | 11/1977 | Wendel | |
| 4,161,169 A | 7/1979 | Brussels et al. | |
| 4,505,261 A * | 3/1985 | Hunter | 126/635 |
| 4,528,976 A | 7/1985 | Baer | |
| 4,622,951 A | 11/1986 | Matzkanin | |
| 4,686,961 A | 8/1987 | Garrison | |
| 4,750,473 A | 6/1988 | Dunn | |
| 4,933,613 A | 6/1990 | Berner et al. | |
| 5,236,625 A | 8/1993 | Bardo et al. | |
| 5,469,915 A * | 11/1995 | Cesaroni | 165/171 |
| 5,482,571 A * | 1/1996 | Yamada et al. | 136/259 |
| 6,014,845 A | 1/2000 | Jain et al. | |
| 6,598,601 B2 * | 7/2003 | Schutz | 126/655 |
| 7,057,821 B2 | 6/2006 | Zincone | |
| 2003/0010335 A1 | 1/2003 | Schutz | |
| 2007/0195544 A1 | 8/2007 | Graves, Jr. | |
| 2008/0250735 A1 | 10/2008 | Patterson | |
| 2009/0129115 A1 | 5/2009 | Fine et al. | |

FOREIGN PATENT DOCUMENTS

JP    55-112956    *    9/1980

* cited by examiner

*Primary Examiner* — Devina Pillay
(74) *Attorney, Agent, or Firm* — Mary J. Gaskin

(57) ABSTRACT

An integrated alternative energy roofing panel incorporates an array of solar concentrator tubes interconnected with transparent web to form a joined plate supported in frame elements with an attached working fluid manifold. The working fluid in the manifold is operatively in contact with the solar concentrator tubes for transferring heat from the tubes. In one exemplary construction, each of the solar concentrator tubes terminates in a conducting metal sleeve which extends beyond the frame element into the manifold. A safety glass panel is attached to one frame element beneath the joined plate. The joined plate and safety glass panel may be sealed to the frame elements to form a chamber and the chamber may be evacuated. A plurality of light emitting diodes (LEDs) are embedded in the web for supplemental lighting. An array of photovoltaic cells mounted to a top surface of the manifold and a battery are interconnected for powering the LEDs. The manifold incorporates a compartment to house the battery as a portion of the integrated panel.

15 Claims, 12 Drawing Sheets

INTEGRATED PANEL WITH SKYLIGHT, VENTILATION, SOLAR HOT WATER SYSTEM AND SOLAR PHOTOVOLTAIC/LIGHTING SYSTEM

BACKGROUND

1. Field

This application relates generally to the field of roof mounted alternative energy system and more particularly to an integrated roof panel incorporating combinable skylight, ventilation, solar hot water, solar photovoltaic electrical power generation and high efficiency lighting.

2. Related Art

Solar hot water systems currently in use employ working fluid tubing and solar collectors supported on or by the sunfacing side of a pitched roof or a inclined support structure mounted on a flat roof. Such systems are unitary in function using collection of solar radiation to heat water for residential, commercial and industrial hot water requirements. Solar photovoltaic systems using arrays of photovoltaic cells are mounted on roof systems in a similar manner. In many homes and industrial buildings, skylights are employed for passive lighting. Each of these system types are employed to displace or reduce the need to use externally generated power for the desired application thereby saving electricity or fossil fuels normally used to produce that power. Typically, surface area used for one application prevents use for a second application and achieving an efficient structural and operational layout with multiple system types, both in original installation and retrofit applications, is unduly cumbersome and expensive.

It is therefore desirable to provide an integrated roofing system which allows interchangeable components with multiple functional capabilities.

SUMMARY

Exemplary embodiments provide an integrated alternative energy roofing panel which incorporates an array of solar concentrator tubes supported in frame elements with an attached working fluid manifold. The working fluid in the manifold is operatively in contact with the solar concentrator tubes for transferring heat from the tubes. In one exemplary construction, each of the solar concentrator tubes terminates in a conducting metal sleeve which extends beyond the frame element into the manifold.

For an exemplary embodiment, the plurality of solar concentrator tubes are interconnected with transparent web to form a joined plate and a safety glass panel is attached to one frame element beneath the joined plate. The joined plate and safety glass panel may be sealed to the frame elements to form a chamber and the chamber may be evacuated. In an exemplary construction, a top surface of the safety glass panel is treated for infrared reflectivity.

A plurality of light emitting diodes (LEDs) are embedded in the web in one form of the embodiment for supplemental lighting. An array of photovoltaic cells and a battery may be interconnected for powering the LEDs. The photovoltaic cell array is mounted to a top surface of the manifold and the manifold incorporates a compartment to house the battery all as a portion of the integrated panel.

In yet another exemplary construction, a linear Fresnel lens panel mounted to one frame element over the solar concentrator tubes focuses sunlight onto the tubes. The linear Fresnel lens panel and joined plate may be sealed to the frame elements to form a second chamber which may also be evacuated.

An additional feature of an exemplary embodiment may be an absorption chiller system receiving heated working fluid from the array of solar concentrator tubes. The absorption chiller system then delivers cooled fluid to a manifold of a radiator unit mounted to the underside of a lower frame element. Vertical fins on the radiator unit allow gravity induced convection cooling.

In certain embodiments, a shade panel may be mounted to a frame element intermediate the joined plate and safety glass panel for reducing natural lighting through the integrated panel.

A complete selective function roofing system may be achieved by a universal mounting frame receiving an integrated panel and having at least one aperture receiving a window elements openable for ventilation. The universal mounting frame may be a pitched panel frame having upstanding support columns extending from a base frame to provide support for an angled frame which receives the integrated panel, said angled frame carried between the base frame and supporting columns at an angle adapted for allowing the integrated panel to be positioned for optimum solar exposure.

The features, functions, and advantages that have been discussed can be achieved independently in various embodiments of the present invention or may be combined in yet other embodiments further details of which can be seen with reference to the following description and drawings.

DETAILED DESCRIPTION

Embodiments of the invention incorporate modular elements that are selectable for mounting in a structural support that provide passive skylighting, ventilation, solar heated hot water, solar photovoltaic electricity generation, high-efficiency electric lighting and associated space heating/cooling capability.

Figure 1A:
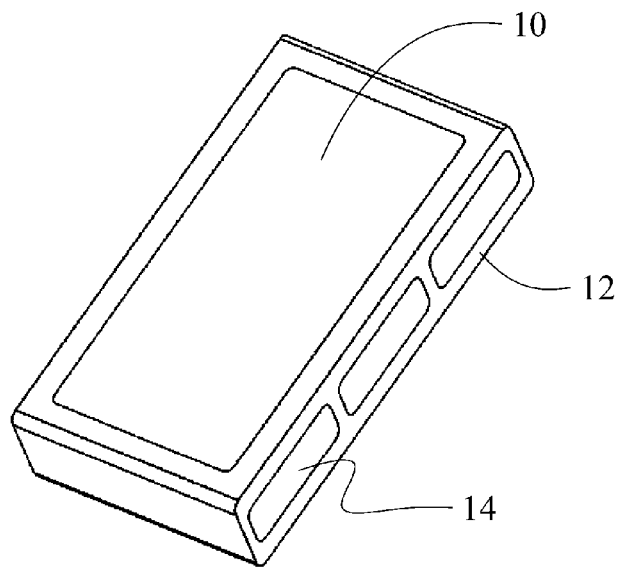
FIG. 1A is an isometric view of an integrated panel of a present embodiment mounted in a universal panel frame.
Figure 1B:
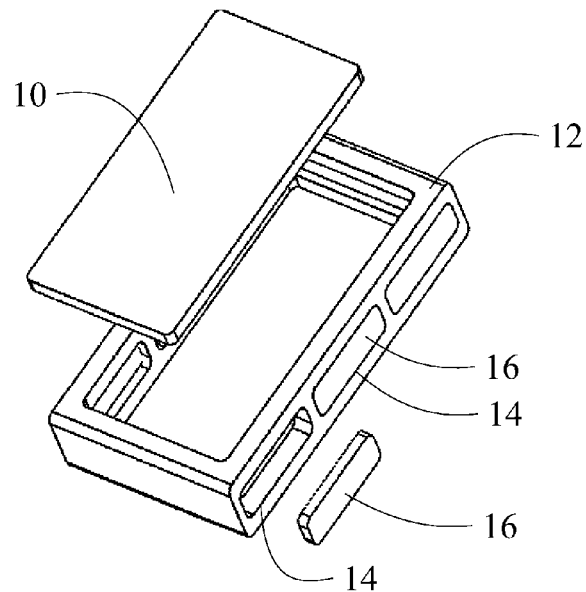
FIG. 1B is an exploded view of the integrated panel and frame elements.

Referring to FIGS. 1A and 1B, a first basic embodiment is shown wherein an integrated panel 10 (to be described in greater detail subsequently) is mounted in a universal panel frame 12. For the embodiment of FIGS. 1A and 1B, the universal panel frame 12 is adapted for mounting to a pitched roof or support with sun exposure optimized by the roof or support pitch and orientation. In this exemplary embodiment, the universal panel frame includes side apertures 14 in which plastic or glass window elements 16 are housed. As will be described subsequently, the integrated panel allows at least partial solar transmission to act as a skylight however, the additional window elements provide supplemental natural lighting. Additionally, the window elements may be hinged to open in the manner of a Jalousie or louvered window or comparable construction to allow natural ventilation.

Figure 2A:
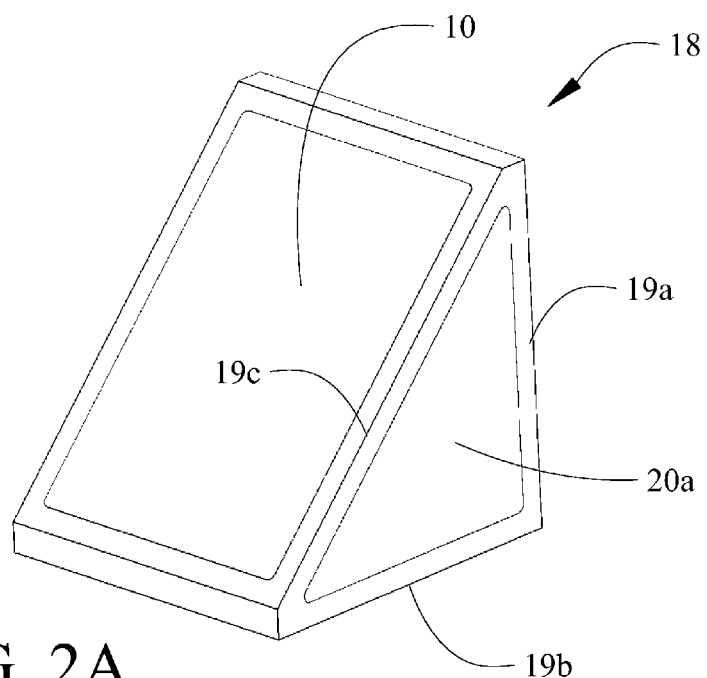
FIG. 2A is an isometric view of an integrated panel of a present embodiment mounted in a pitched panel frame.
Figure 2B:
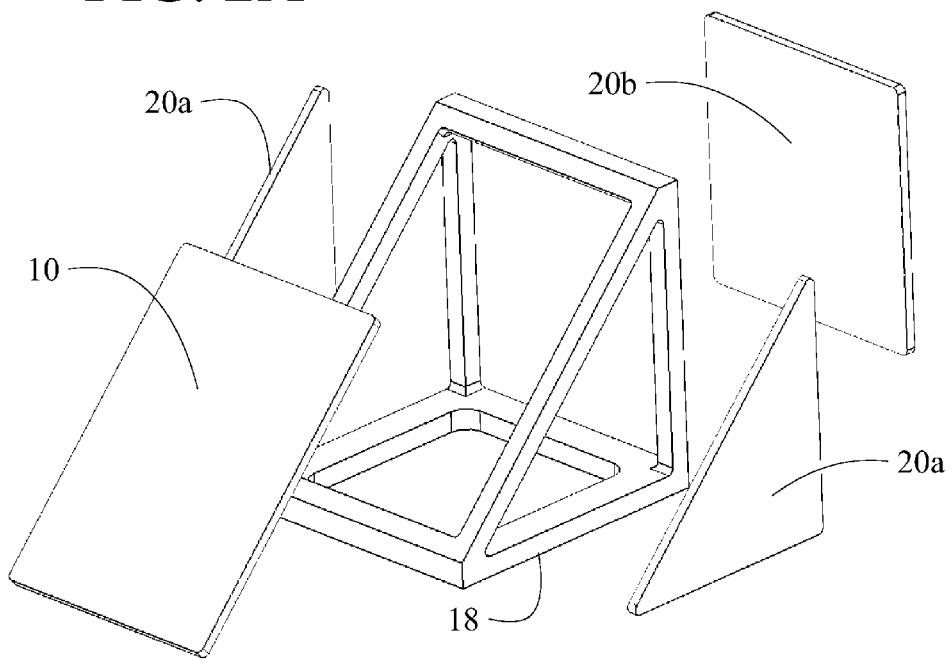
FIG. 2B is an exploded view of the integrated panel and pitched panel frame elements.

FIGS. 2A and 2B show a second basic embodiment wherein a pitched panel frame 18 is employed for mounting the integrated panel 10. The pitched panel frame is adapted for use on a flat roof having upstanding support columns 19a extending from a base frame 19b to provide support for an angled frame 19c which receives the integrated panel and is carried between the base frame and supporting columns at an angle adapted for allowing the integrated panel to be positioned for optimum solar exposure. As in the embodiment of FIGS. 1A and 1B, the second basic embodiment employs window elements 20a and 20b for additional passive natural lighting. Also, the window element 20b may be hinged or louvered for opening to provide natural ventilation.

In the embodiments of both FIGS. 1A and 1B and FIGS. 2A and 2B, the integrated panel may be hinged to the panel frame to be opened creating a ventilation air path. Both the universal panel frame 12 and pitched panel frame 18 may employ channeled construction for routing of interconnecting componentry for the integrated panels as will be described in greater detail subsequently.

Figure 3A:
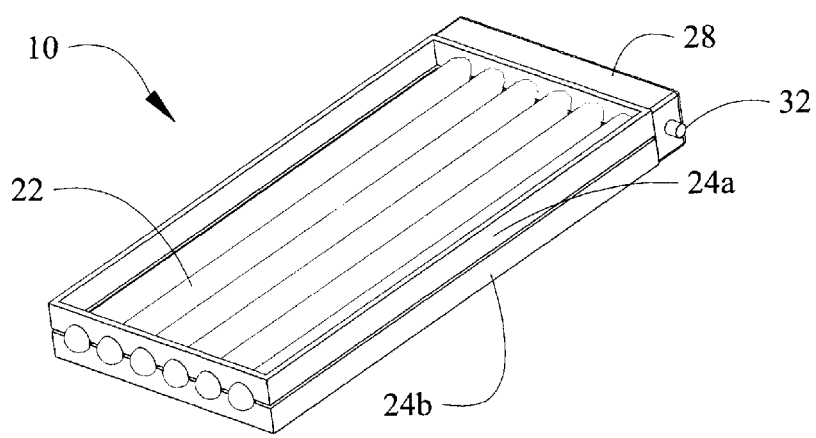
FIG. 3A is an isometric view of a first embodiment of the integrated panel.
Figure 3B:
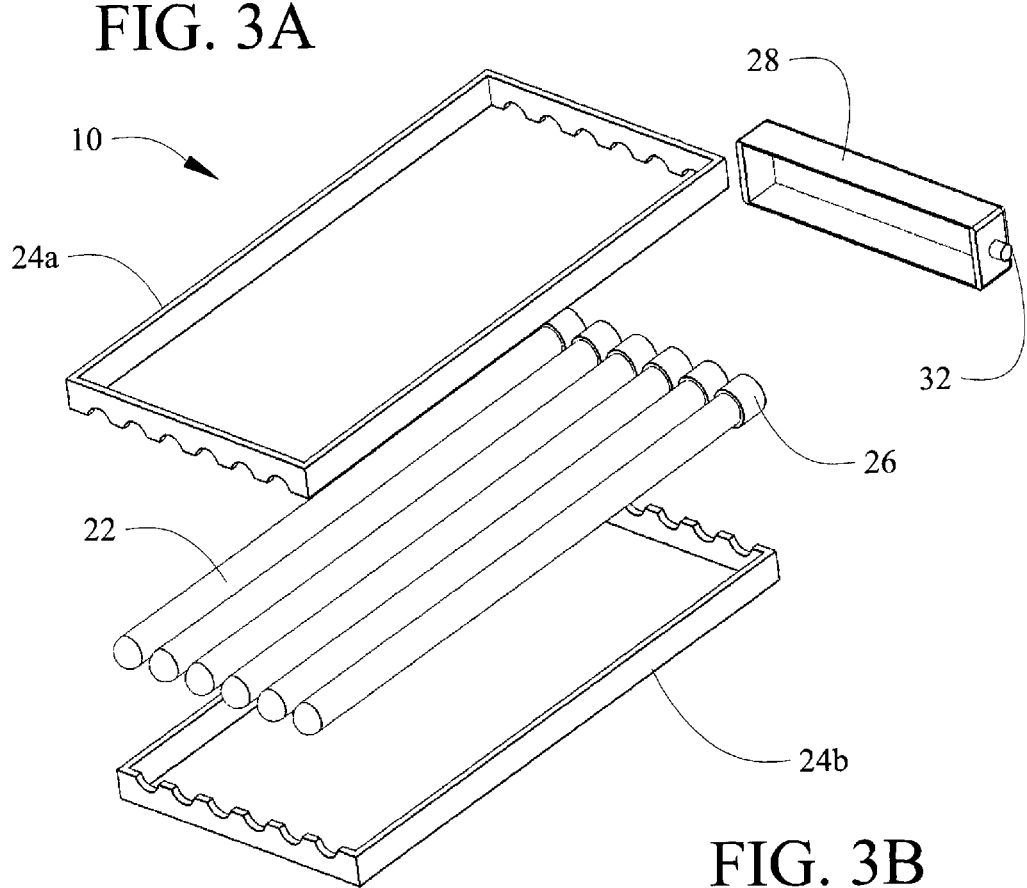
FIG. 3B is an exploded view of the elements of the first embodiment.

Details of a first construction for the integrated panel are shown in FIGS. 3A and 3B. An array of glass solar concentrator tubes 22 which for the embodiment shown may be concentric tubes which employ solar radiation on the inner glass tube to heat air or other working gas. Such tubes are commercially available such as Solel 6 from Solel, Inc., 8105 Irvine Center Drive, Suite 1130, Irvine, Calif. 92618. Frame element, for the embodiment shown, upper frame 24a and lower frame 24b, constrain the concentrator tubes and provide a structural frame for the integrated panel. Each concentrator tube terminates in a conducting metal sleeve 26 which is heated by the working gas in the concentrator tube. For the embodiment shown, the sleeves extend beyond the upper and lower frames at one end of the integrated panel. In alternative embodiments, sleeves at each end of the tubes or on alternating ends of the tubes may extend beyond the upper and lower frames at opposite ends. A water manifold 28, attached to the upper and lower frames for the embodiment shown, encases the conducting metal sleeves allowing water or other working fluid to be circulated through inlet 30 and outlet 32 over the sleeves transferring heat to the working fluid. For water systems, the heated water may then be circulated to the plumbing system for the building and employed for hot water needs in the building. Alternatively, the heated working fluid may be used for heat transfer to thermal storage masses or radiant elements for space heating in the building or other heating needs.

FIGS. 4A-4D demonstrate additional features of certain embodiments of the integrated panel 10. Skylight functionality for the panel for passive lighting may be further enhanced by joining the tubes 22 with a thin web 34 of clear plastic or other transparent material bonded between adjacent tubes to form a joined plate 36 of solar tubes within the upper and lower frame. Additionally, a safety glass panel 38 (best seen in FIG. 4D) is attached to the bottom of the lower frame 24b. Imbedded wire or other reinforcements are provided in the safety glass panel to strengthen the panel against breakage and to maintain the integrity of the panel should fracturing of the glass occur. Additionally, the safety glass panel top surface 40 is treated to be infrared reflecting to minimize heat transfer into the skylit room below the integrated panel while maximizing heating of the solar concentrator tubes. The perimeter of the joined plate 36, the intermediate webs 34 and the safety glass panel 38 are sealed to provide a chamber 42 (best see in FIG. 4C) which may be evacuated or filed with chosen inert gas to further reduce thermal transmission and noise. The "dual glazing" effect of the joined plated and safety glass for reduced thermal transfer through the integrated panel is further enhanced by the diversion of a substantial portion of the infrared energy entering the panel by the solar concentrator tubes for the working fluid heating as described above. However, a substantial portion of the visible wavelengths are transmitted for passive natural lighting.

Artificial lighting for night use or a supplemental lighting when required is provided by embedding light emitting diodes (LEDs) 44 in the intermediate webs 34 of the joined plate 36. Power for the LEDs may be obtained from integral solar photovoltaic devices, as will be described in greater detail subsequently.

Figure 4A:
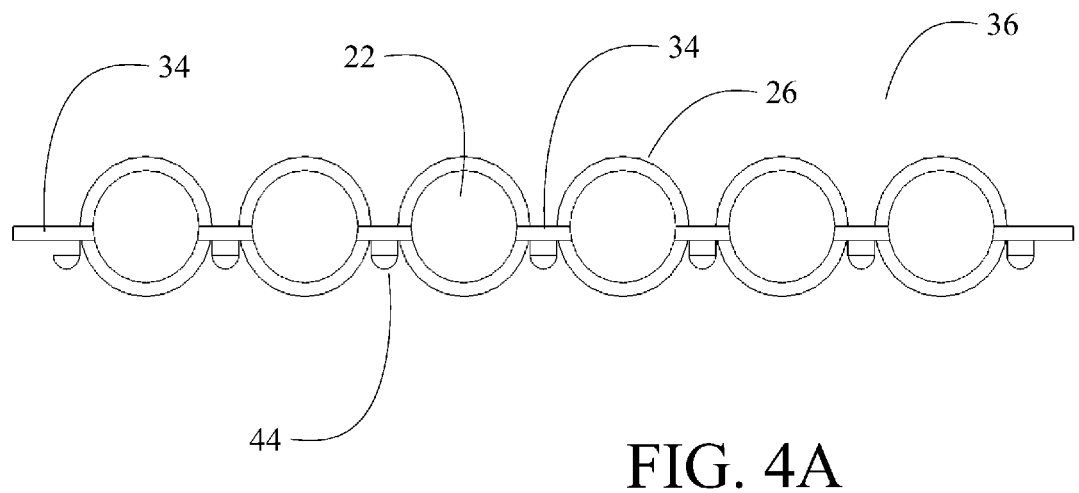
FIG. 4A is an end view of a joined plate for solar concentrator tubes joined with intermediate webs.
Figure 4B:
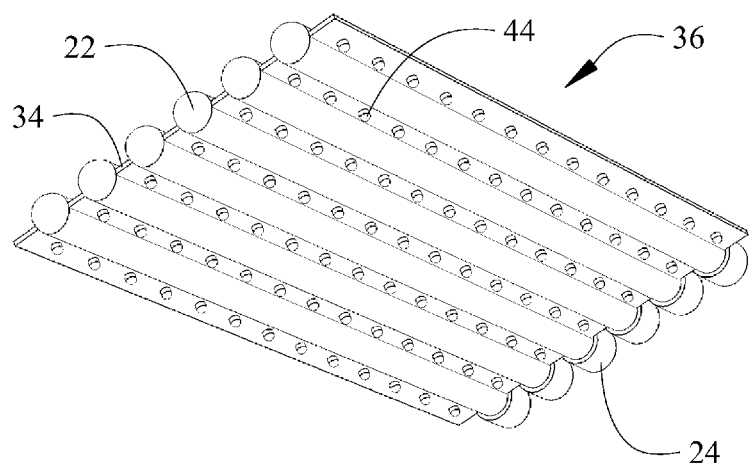
FIG. 4B is an isometric view of the joined plate.
Figure 4C:
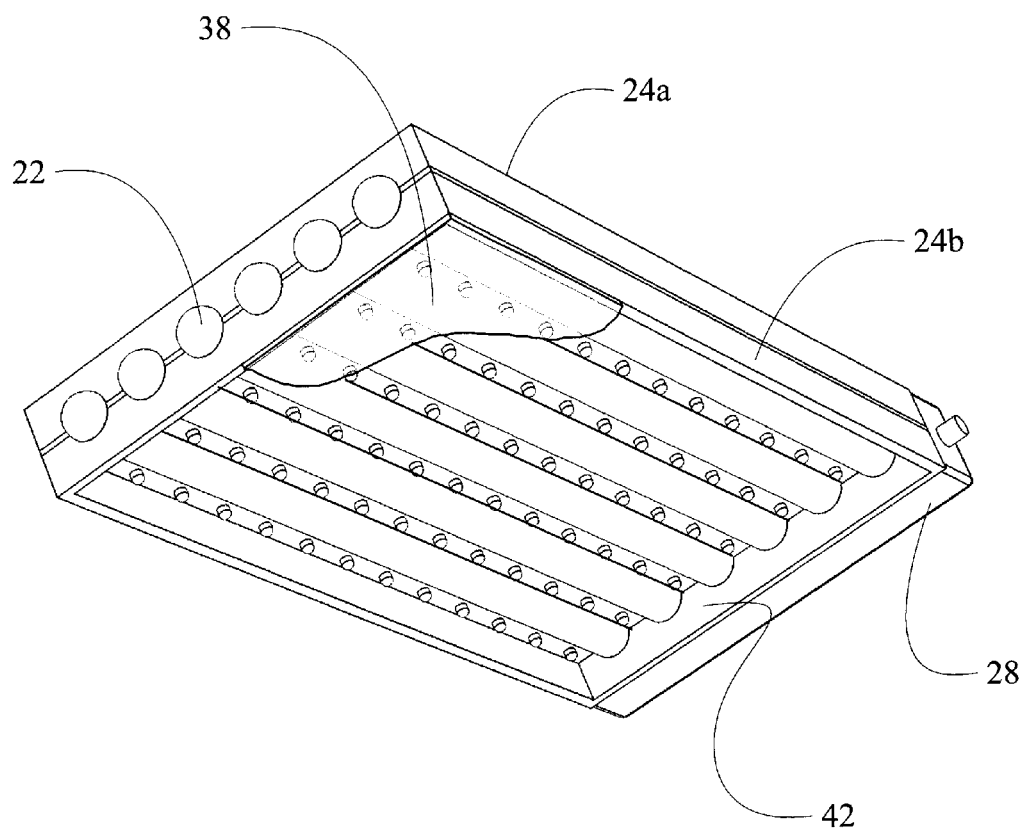
FIG. 4C is a bottom isometric view of an integrated panel employing the joined plate.
Figure 4D:
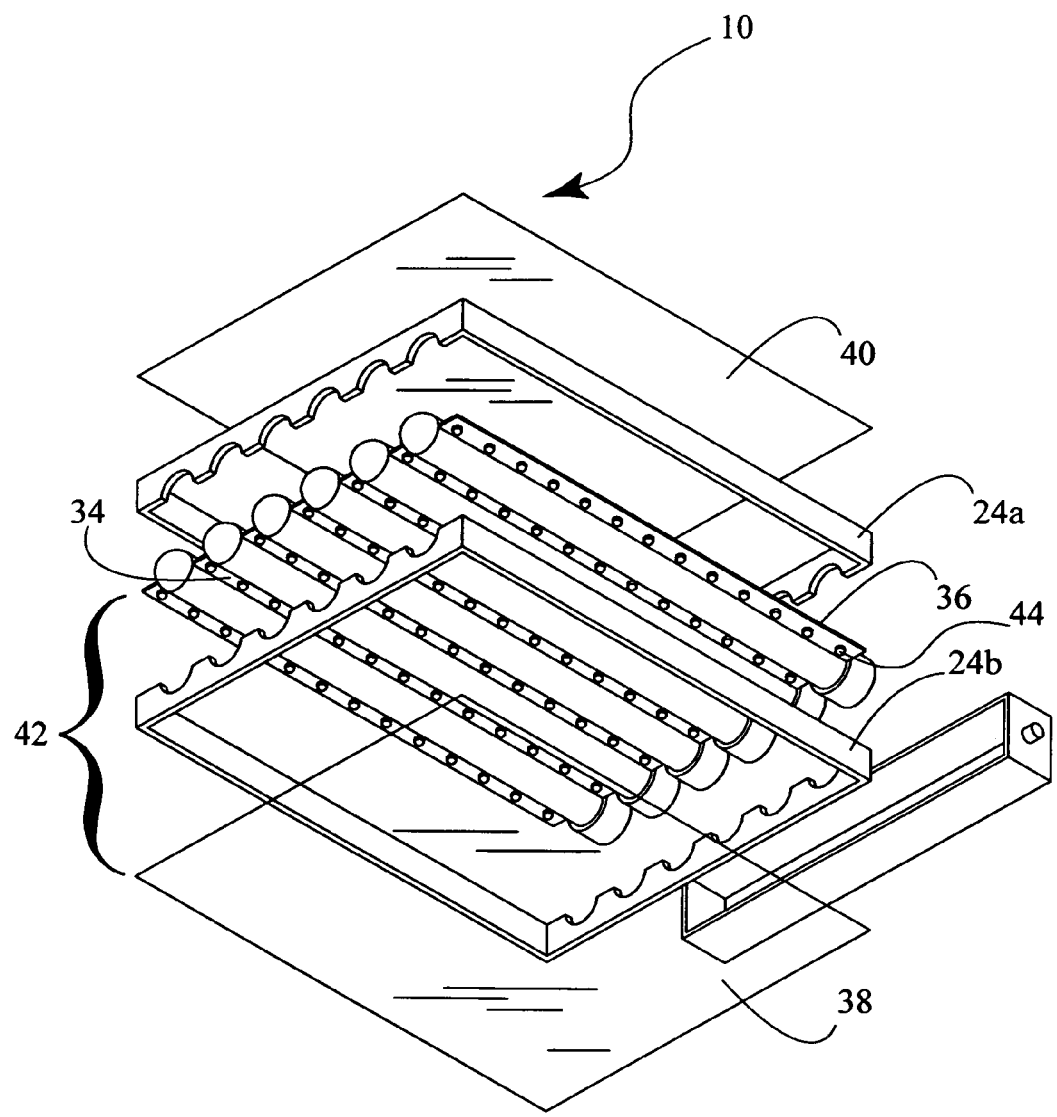
FIG. 4D is an exploded view of the embodiment of FIG. 4C.
Figure 4E:
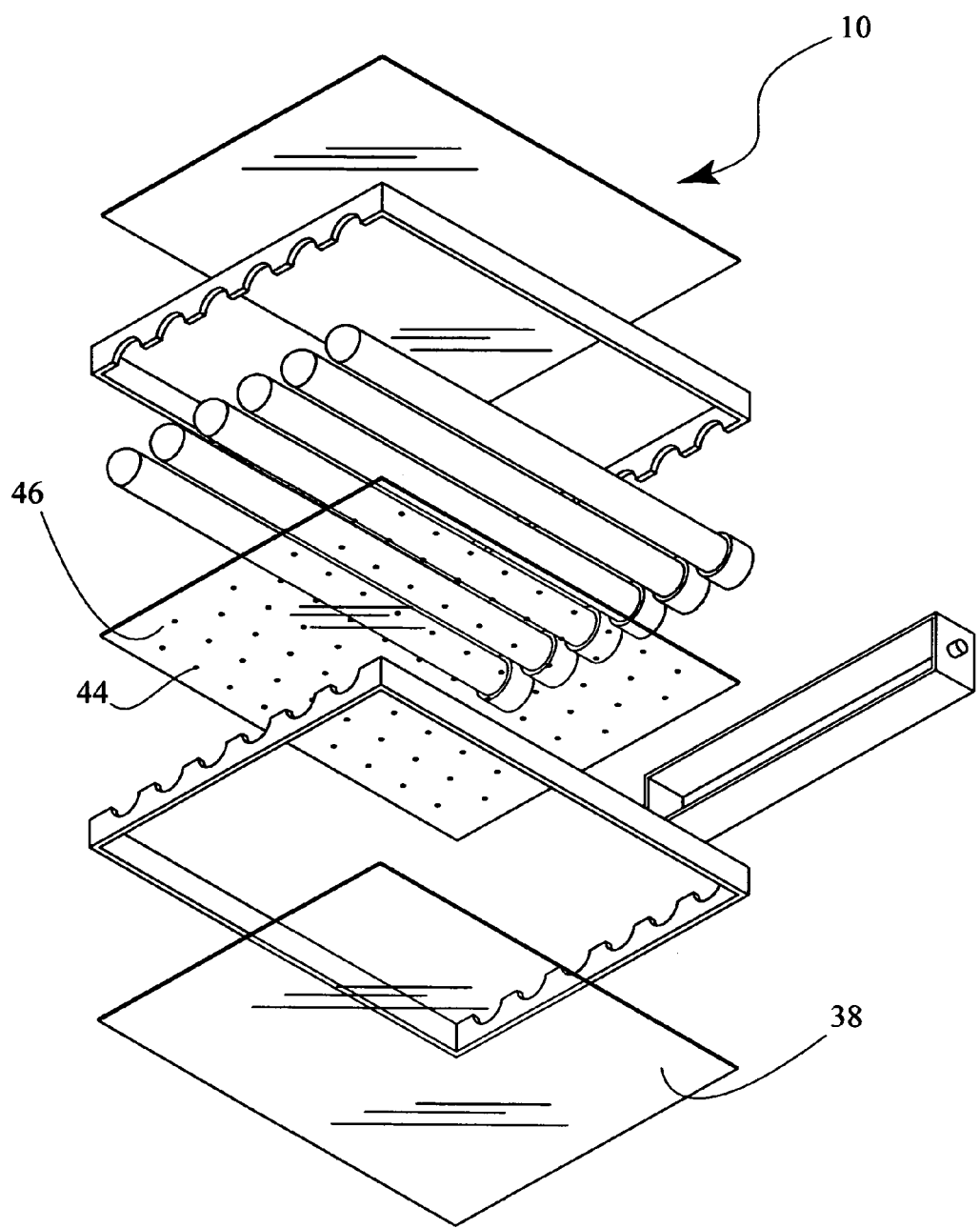
FIG. 4E is an exploded view of additional feature elements of an embodiment.

An alternative embodiment is shown in FIG. 4E wherein LED lighting may be incorporated into the panel using an integrated plate 46 of clear plastic or other transparent material supported in the upper and lower frames intermediate the tube array and safety glass into which LEDs 44 are mounted. The integrated plate 46 and safety glass panel 38 then provide the double glazing effect.

Figure 5A:
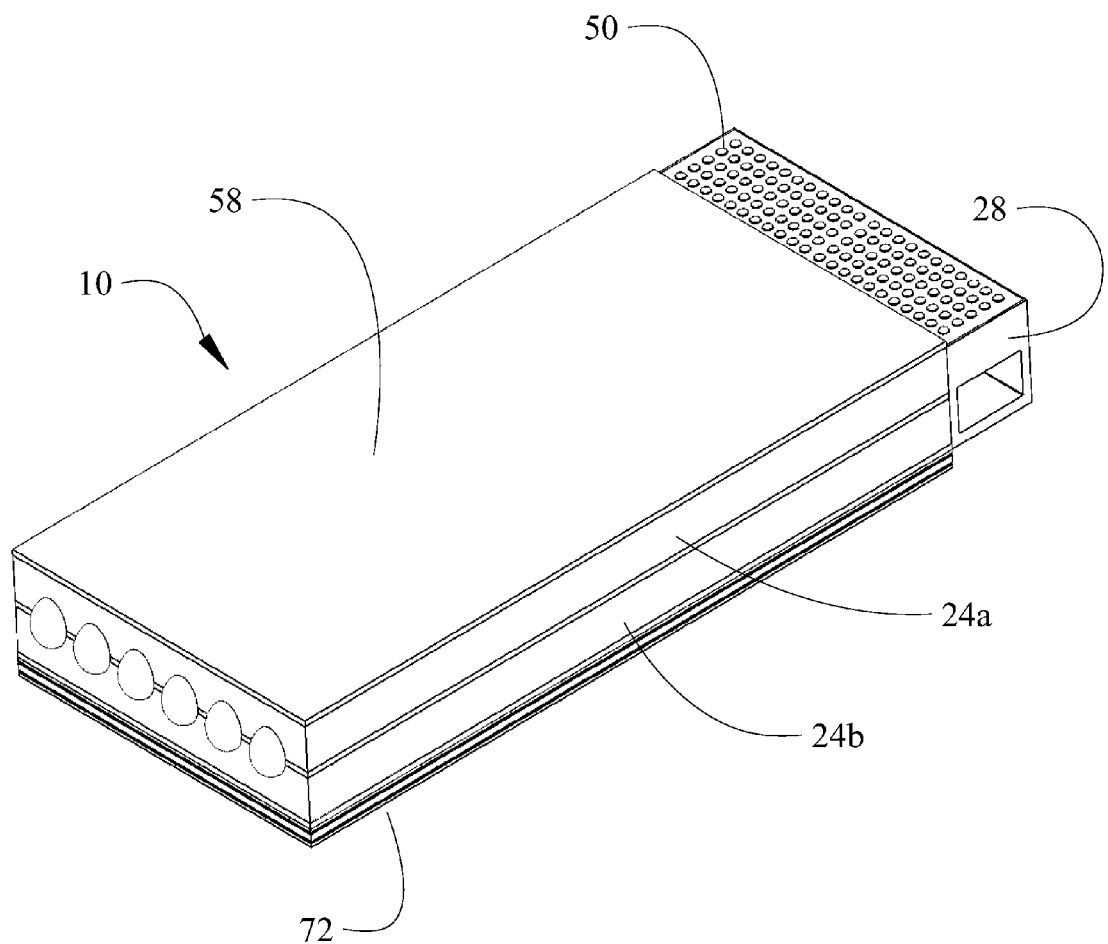
FIG. 5A is an isometric view of another embodiment of the integrated panel.
Figure 5B:
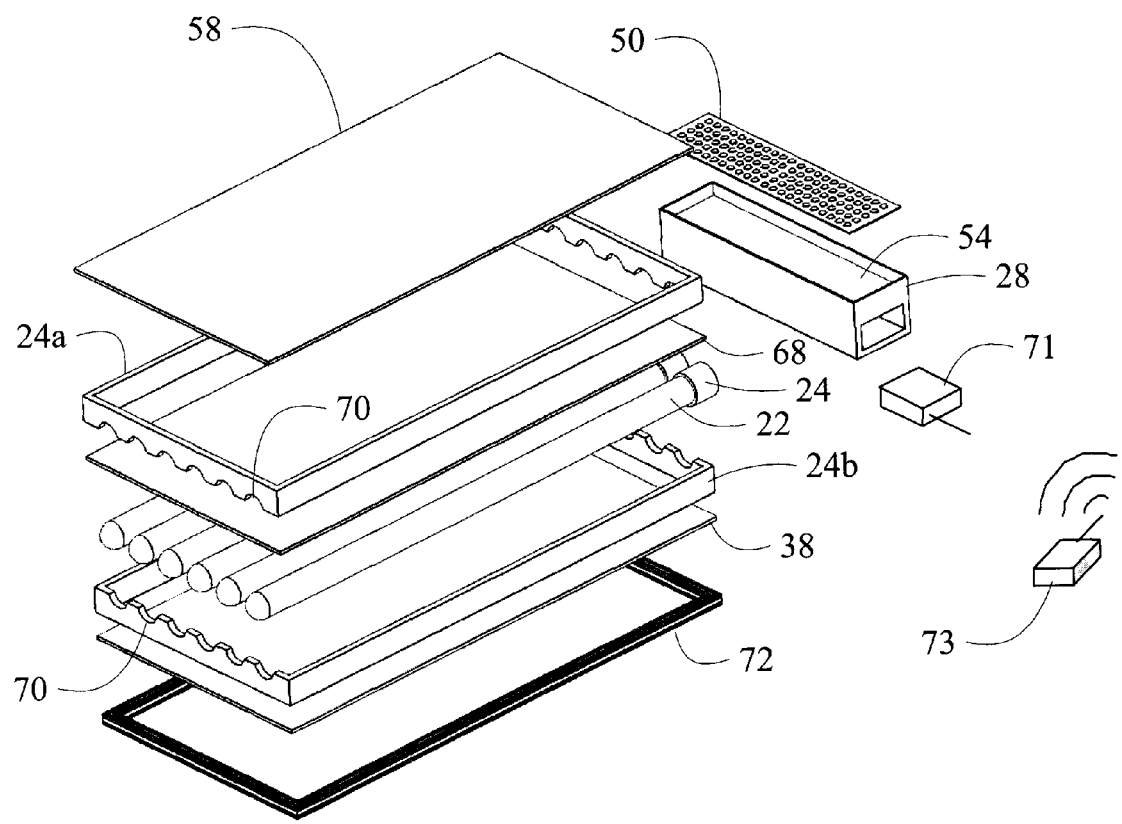
FIG. 5B is an exploded view of the elements of the embodiment of FIG. 5A.
Figure 5C:
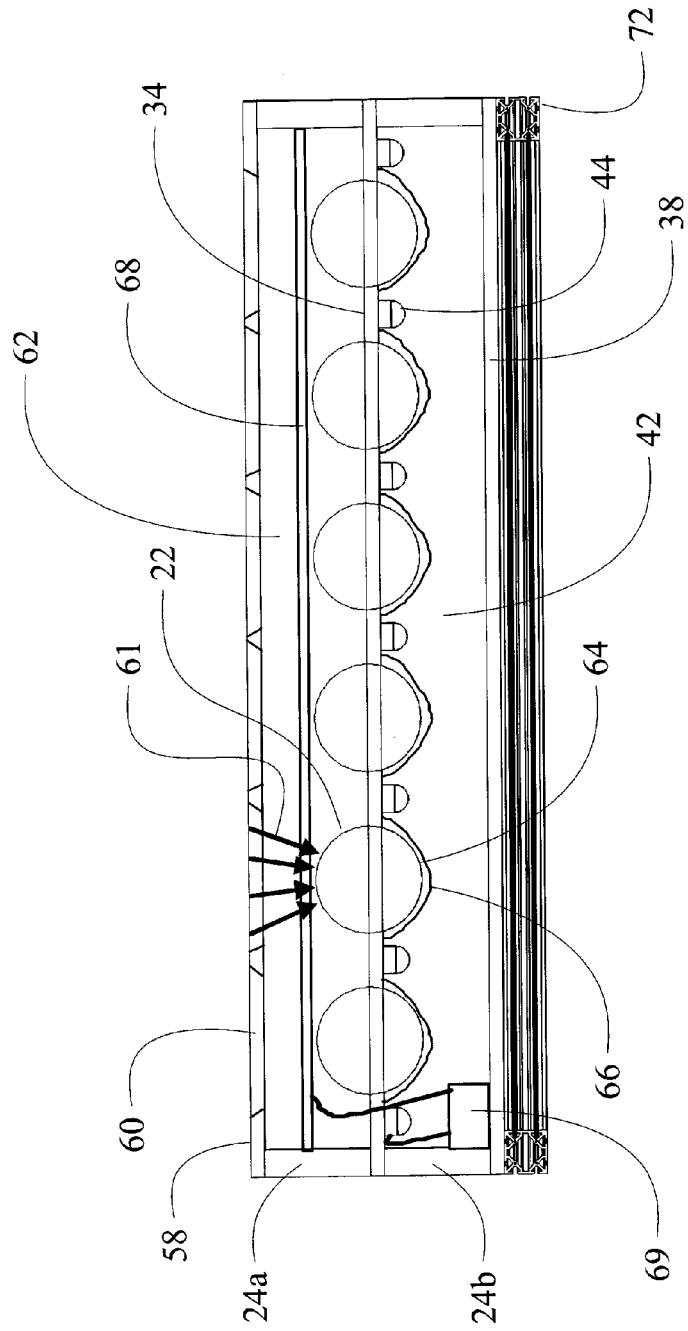
FIG. 5C is an end section view of the embodiment of FIG. 5A.

Further features of an additional embodiment of the integrated panel 10 are shown in FIGS. 5A, 5B and 5C. A photovoltaic cell array 50 is mounted to an upper surface 52 of the manifold 28. The manifold further incorporates a compartment 54 in which a battery pack 56 resides. The pholotoltaic cell array charges the battery pack during sunlight hours and the battery pack is connected for supplying power to the LEDs mounted in the panel as previously described for night use or supplemental lighting as required.

A linear Fresnel lens panel 58 is mounted to the upper frame 24a over the solar concentrator tubes 22. The Fresnel lenses 60 as shown in FIG. 5C concentrate the solar radiation represented by arrows 61 directly on the tubes lying parallel underneath the lens. The Fresnel lens panel is sealed to the upper frame and in conjunction with the joined plate 36 incorporating the tubes forms a chamber 62 which is evacuated to further minimize heat transmission into the skylit room. For the exemplary embodiment, the underside 64 of the concentrator tubes 22 is coated or laminated with a transparent plastic sheathing 66 which may be integrated as a portion of the intermediate webs or a separate element to provide an additional safety barrier in the event of breakage of one or more tubes.

A shade panel 68, best seen in FIGS. 5B and 5C is supported within the frames to provide control of incoming sunlight during daylight hours. The shade panel may be an electronically controlled polarized or liquid crystal panel or a mechanical shade that may be extended or withdrawn as required. The mechanical shade may be motorized or manually operated. Placement of the shade panel above the concentrator tubes allows for control of both the heating of the tubes and solar light/heat transmission through the integrated panel into the skylit room. In alternative embodiments, the shade panel or a second shade panel may be placed between the joined plate 36 with the concentrator tubes and the safety glass panel 38 thereby allowing the skylit room to be darkened while solar radiation is still incident on the concentrator tubes for hot water applications. Electrical power for either a motorized shade or electronically controlled dimmer in one or both shade panels may be provided by the battery pack 56. For self contained integrated panels in which electrical power is provided by the photovoltaic panel and battery pack, a remote wireless switch assembly 69 may be employed for control interconnection of the LEDs and shade panel for operation by a wireless transmitting wall switch.

As seen in FIG. 5C, support of the joined plate 36 carrying the solar concentrator tubes 22 within the upper and lower frame may be accomplished by clamping the periphery of the web 34 between the upper frame 24a and lower frame 24b. This may additionally facilitate the sealing of chambers 42 and 62 as previously described. As see in FIGS. 3B, 4D and 5B, the lateral extents of the upper frame and lower frame may contain scallops 70 to receive the concentrator tube circumference adjacent the tube ends for additional support.

As shown in FIGS. 5B and 5C, the described embodiment may additionally include a roof mounting frame 72. Additionally, due to the integrated nature of the panels, a remote receiver 71 may be included in the compartment 28 to receive signals from a remote control 73 for operation of the LED lighting or shade functions.

Figure 6:
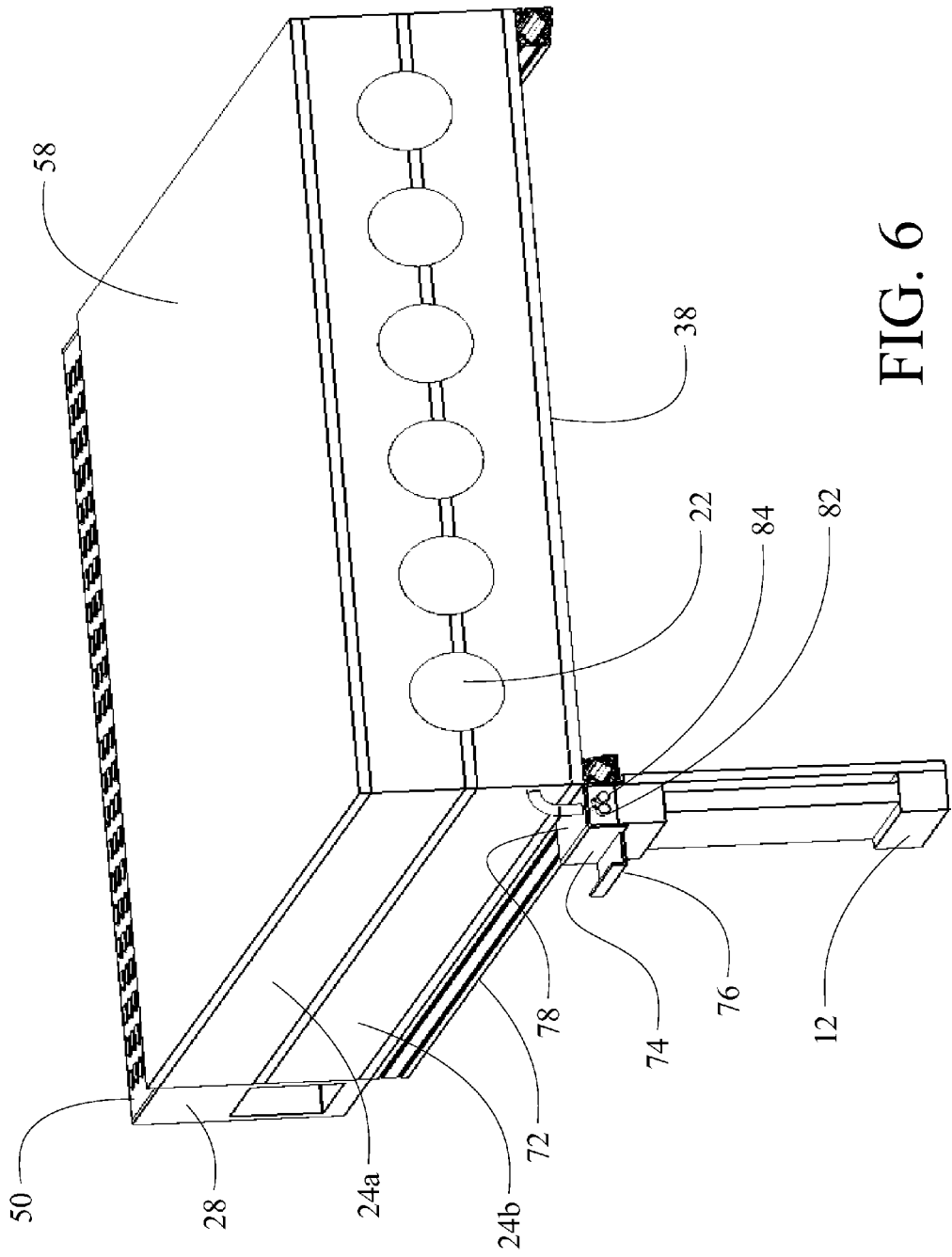
FIG. 6 is an isometric view of the mounting of an integrated panel.

FIG. 6 demonstrates an attachment arrangement for the mounting frame and the integrated panels to a roof structure. A saddle 74 employs lateral channels 76 which receive the roof mounting frame. As shown in the figure, adjacent panels are accommodated by the saddle. An inverted channel web 78 of the saddle is received over a structural member which may be a universal panel frame 12 as described in FIGS. 1A, 1B, 2A and 2B or an engineered rafter or other integral roof structural member. For the embodiment shown, the channel web incorporates a conduit 80 for carrying working fluid plumbing lines 82 and/or electrical cabling 84 for control and operation of the LEDs and shade panels, including interconnection of the solar photovoltaic panels and related switching and batteries.

Figure 7:
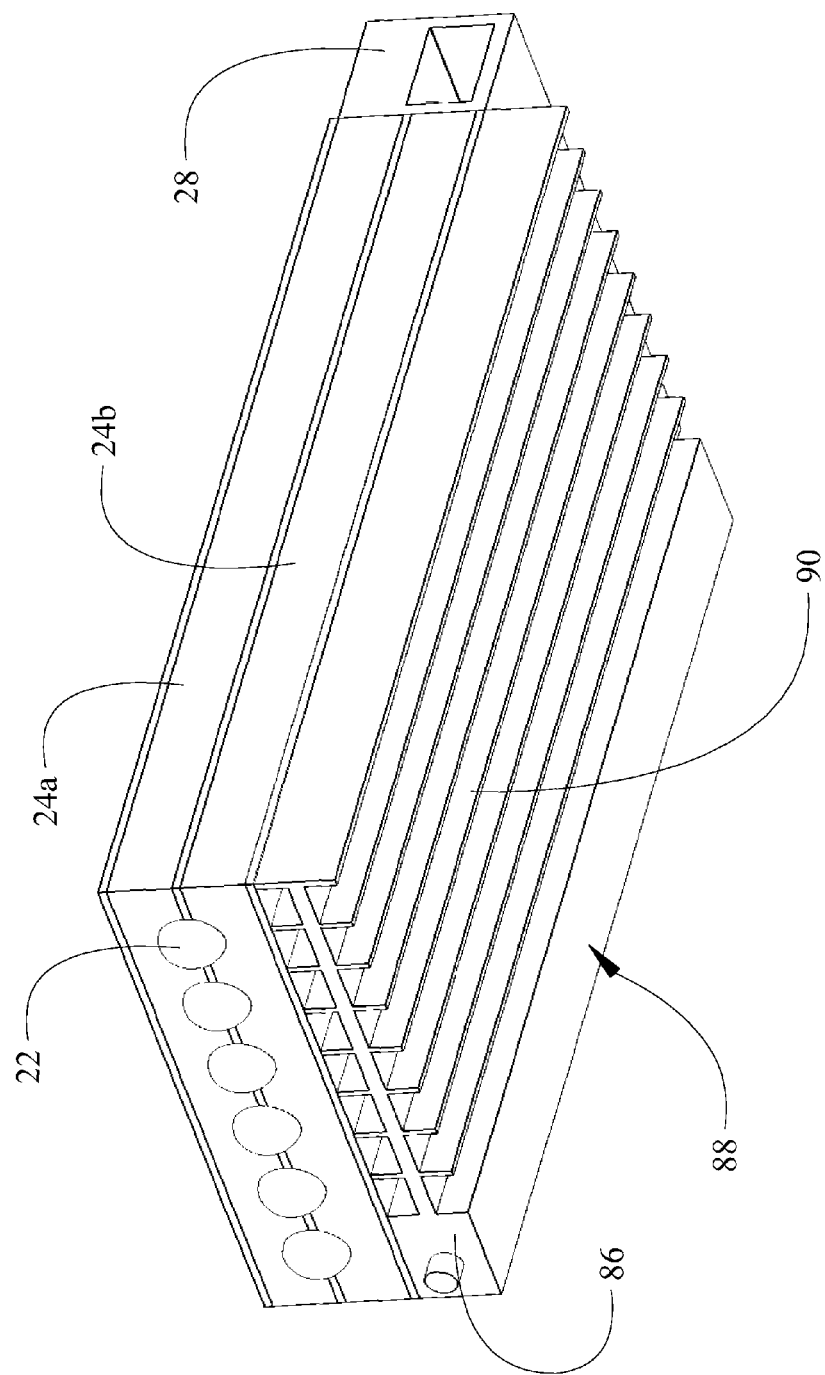
FIG. 7 is an isometric view of another embodiment employing a radiator panel.

Yet an additional feature of the construction of another embodiment shown in FIG. 7 provides for use of the heated working fluid from the integrated panel to feed an absorption chiller system which then delivers cooled fluid to a manifold 86 of a radiator unit 88 mounted to the underside of the lower frame 24b. Vertical fins 90 in the radiator with perforated lateral webs allow the natural skylight capability of the integrated panel to remain effective. Cooling air near the ceiling in the skylit room with the radiator allows cooler denser air to flow downward to lower levels of the room providing overall passive cooling for the room.

The commonality of dimensions and mounting for the various embodiments disclosed herein provides for a prefabricated roof system which mixes the types of integrated panels disclosed herein. As an example, one row of panels may carry embodiments with the LEDs as described for supplemental lighting while other rows of panels or interspersed individual panels may employ the absorption chiller radiators for room cooling. Thus in the design of a new building or in retrofitting of existing structures, the project architect can mix and match panel types to optimize the lighting, air movement, water heating and space heating/cooling.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An integrated alternative energy roofing panel comprising:
   a plurality of solar concentrator tubes;
   a transparent web bonded between adjacent solar concentrator tubes;
   upper frame element and lower frame element supporting the solar concentrator tubes; and,
   a working fluid manifold attached to the upper frame element and the lower frame element and operatively in contact with the solar concentrator tubes for transferring heat from the solar concentrator tubes;
   a plurality of light-emitting diodes (LEDs) embedded in the transparent web.

2. The integrated alternative energy roofing panel defined in claim 1 wherein each of the solar concentrator tubes terminates in a conducting metal sleeve, said sleeve extending beyond the upper frame element and the lower frame element into the manifold.

3. The integrated alternative energy roofing panel defined in claim 1 further comprising a safety glass panel attached to the lower frame element beneath the solar concentrator tubes.

4. The integrated alternative energy roofing panel defined in claim 3 wherein the transparent web and safety glass panel are sealed to the upper and lower frame elements to form a chamber.

5. The integrated alternative energy roofing panel defined in claim 4 wherein the chamber is evacuated.

6. The integrated alternative energy roofing panel defined in claim 3 wherein a top surface of the safety glass panel is treated for infrared reflectivity.

7. The integrated alternative energy roofing panel defined in claim 4 further comprising a shade panel mounted between the upper frame element and the solar concentrator tubes.

8. The integrated alternative energy roofing panel defined in claim 7 further comprising a remote control transmitter and a remote control receiver for control of the LEDs.

9. The integrated alternative energy roofing panel defined in claim 1 further comprising an array of photovoltaic cells and a battery interconnected for powering the LEDs.

10. The integrated alternative energy roofing panel defined in claim 9 wherein the photovoltaic cell array is mounted to a top surface of the manifold and the manifold incorporates a compartment to house the battery.

11. The integrated alternative energy roofing panel defined in claim 1 further comprising a linear Fresnel lens panel mounted to the upper frame element over the solar concentrator tubes to focus sunlight onto the solar concentrator tubes.

12. The integrated alternative energy roofing panel defined in claim 11 wherein the linear Fresnel lens panel is sealed to the upper frame element to form a chamber above the solar concentrator tubes, the chamber being evacuated.

13. The integrated alternative energy roofing panel defined in claim1 further comprising:
   an absorption chiller system receiving heated working fluid from the plurality of solar concentrator tubes, said absorption chiller system delivering cooled fluid to a manifold of a radiator unit mounted to the underside of a lower frame element, said radiator unit having vertical fins.

14. The integrated alternative energy roofing panel defined in claim 9 further comprising a remote control transmitter and a remote control receiver for control of the LEDs.

15. An integrated alternative energy roofing panel comprising:
- an upper frame element and a lower frame;
- a working fluid manifold attached to the upper frame element and the lower frame element, the manifold having a compartment sealed from the working fluid;
- a plurality of solar concentrator tubes supported by the upper frame element and the lower frame element and sealed thereto, each of the solar concentrator tubes terminating in a conducting metal sleeve extending beyond the upper frame element and the lower frame element into the manifold for transferring heat from the solar concentrator tubes to working fluid in the manifold;
- a transparent web bonded between adjacent solar concentrator tubes;
- a plurality of light emitting diodes (LEDs) embedded in the web;
- a photovoltaic cell array mounted to a top surface of the manifold;
- a battery mounted in the compartment in the manifold and interconnected to the photovoltaic cell array and the LEDs;
- a safety glass panel having an infrared reflecting upper surface mounted to the lower frame element and sealed beneath the solar concentrator tubes to form a chamber, said chamber evacuated for enhanced thermal insulation;
- a Fresnel lens panel mounted to the upper frame element over the solar concentrator tubes to focus sunlight onto the solar concentrator tubes and sealed to form a second chamber; and,
- a shade panel mounted between the solar concentrator tubes and the safety glass panel and operable to reduce sunlight transmitted through the integrated panel.

* * * * *